United States Patent
Fridman et al.

(10) Patent No.: US 10,821,948 B2
(45) Date of Patent: Nov. 3, 2020

(54) ELECTRIC PARKING BRAKE WITH REGENERATIVE BRAKING CONTROL SYSTEM AND METHOD

(71) Applicant: Ford Global Technologies, LLC, Dearborn, MI (US)

(72) Inventors: Moses Alexander Fridman, West Bloomfield, MI (US); Kevin Sallee, Ferndale, MI (US); Dale Scott Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 234 days.

(21) Appl. No.: 15/808,312

(22) Filed: Nov. 9, 2017

(65) Prior Publication Data
US 2019/0135249 A1    May 9, 2019

(51) Int. Cl.
| | |
|---|---|
| G06F 7/70 | (2006.01) |
| B60T 8/32 | (2006.01) |
| F16D 65/18 | (2006.01) |
| B60T 13/66 | (2006.01) |
| F16D 55/226 | (2006.01) |
| B60T 1/10 | (2006.01) |
| F16D 61/00 | (2006.01) |
| B60T 13/74 | (2006.01) |
| B60L 7/18 | (2006.01) |
| B60L 7/26 | (2006.01) |
| B60T 7/02 | (2006.01) |
| B60T 7/12 | (2006.01) |
| B60T 8/17 | (2006.01) |

(52) U.S. Cl.
CPC .................... *B60T 8/32* (2013.01); *B60L 7/18* (2013.01); *B60L 7/26* (2013.01); *B60T 1/10* (2013.01); *B60T 7/02* (2013.01); *B60T 7/12* (2013.01); *B60T 8/17* (2013.01); *B60T 13/662* (2013.01); *B60T 13/741* (2013.01); *F16D 55/226* (2013.01); *F16D 61/00* (2013.01); *F16D 65/183* (2013.01); *B60T 2201/10* (2013.01); *B60T 2270/60* (2013.01); *B60T 2270/604* (2013.01)

(58) Field of Classification Search
CPC ........ B60T 8/32; B60T 13/741; B60T 13/662; B60T 1/10; B60T 8/17; B60T 7/12; B60T 7/02; B60T 2270/604; B60T 2201/10; B60T 2270/60; F16D 65/183; F16D 61/00; F16D 55/226; B60L 7/26; B60L 7/18; G06F 7/70
USPC ...... 701/36, 70, 71; 303/3, 10, 151; 180/165
See application file for complete search history.

(56) References Cited

U.S. PATENT DOCUMENTS

| | | | |
|---|---|---|---|
| 6,364,434 B1 | 4/2002 | Sway-Tin et al. | |
| 9,045,116 B2 * | 6/2015 | Takahashi | ............... B60T 7/042 |
| 9,415,692 B2 * | 8/2016 | Kato | ........................ B60L 7/18 |

(Continued)

OTHER PUBLICATIONS

BOLT EV Owner's Manual, chevrolet.com, 2017, 13 pgs.

*Primary Examiner* — Shardul D Patel
(74) *Attorney, Agent, or Firm* — David Kelley; Brooks Kushman P.C.

(57) ABSTRACT

A vehicle includes a user-actuatable switch and a controller. When the switch is actuated, the controller is adapted to effect a regenerative braking command to actuate a regenerative brake system when a vehicle speed is above a threshold speed, and to effect a parking brake command to actuate an electric park brake when the vehicle speed is less than or equal to the threshold speed.

20 Claims, 5 Drawing Sheets

(56) References Cited

U.S. PATENT DOCUMENTS

| | | | |
|---|---|---|---|
| 2007/0222287 A1* | 9/2007 | Crombez | B60L 7/18 |
| | | | 303/151 |
| 2011/0139555 A1* | 6/2011 | Hori | B60T 13/741 |
| | | | 188/72.1 |
| 2012/0139329 A1* | 6/2012 | Fabini | B60L 7/10 |
| | | | 303/3 |
| 2013/0138316 A1* | 5/2013 | Koyama | B60T 8/32 |
| | | | 701/70 |
| 2013/0306389 A1* | 11/2013 | Penev | B60L 8/003 |
| | | | 180/165 |
| 2014/0277983 A1* | 9/2014 | Bayar | B60L 7/18 |
| | | | 701/71 |
| 2015/0066326 A1* | 3/2015 | Furuyama | B60T 7/042 |
| | | | 701/70 |
| 2016/0001781 A1* | 1/2016 | Fung | B60W 40/08 |
| | | | 701/36 |
| 2016/0121861 A1* | 5/2016 | Korte | B60T 7/12 |
| | | | 701/70 |
| 2016/0272176 A1* | 9/2016 | Furuyama | B60T 8/17616 |
| 2017/0203762 A1* | 7/2017 | Khafagy | B60K 37/02 |

* cited by examiner

ELECTRIC PARKING BRAKE WITH REGENERATIVE BRAKING CONTROL SYSTEM AND METHOD

TECHNICAL FIELD

This disclosure relates generally to vehicles with parking brake controllers and, more particularly, to vehicles having a switch for actuating a regenerative braking system and an electric parking brake.

BACKGROUND

Conventional mechanical parking brake systems are configured such that, when the driver activates (e.g., pulls upward on) a parking brake lever coupled via a cable to the rear brakes of the vehicle, a braking force is applied to the rear wheels via the rear brakes.

Conventional electric parking brake systems are configured such that, when the driver activates (e.g., pulls upward on) a parking brake switch while driving, the vehicle is steadily slowed and/or brought to a controlled stop using the hydraulic control unit of the vehicle to provide hydraulic pressure to all four wheels of the vehicle. Conventional electric parking brake systems utilize a friction braking control system that may be provided with the vehicle.

SUMMARY

In at least one approach, a vehicle is provided. The vehicle may include a user-actuatable switch and a controller adapted. When the switch is actuated, the controller may be adapted to effect a regenerative braking command to actuate a regenerative brake system when a vehicle speed is above a threshold speed, and to effect a parking brake command to actuate an electric park brake when the vehicle speed is less than or equal to the threshold speed.

In at least another approach, a method for operating a vehicle includes, at a controller, responsive to a user-actuatable switch being actuated when a vehicle speed is above a threshold speed, effecting a regenerative braking command to actuate a regenerative brake system. The method may further include, at the controller, responsive to the user-actuatable switch being actuated when the vehicle speed is less than or equal to the threshold speed effecting a parking brake command to actuate an electric park brake.

In at least another approach, a vehicle may include a user-actuatable switch and a controller. The controller may be adapted, when the user-actuatable switch is actuated, to effect a regenerative braking command to actuate a regenerative brake system when the switch is in a first position and a vehicle speed is above a threshold speed. The controller may further be adapted, when the user-actuatable switch is actuated, to effect a friction braking command to actuate a friction brake system when the switch is in a second position different than the first position and the vehicle speed is above the threshold speed. The controller may further be adapted, when the user-actuatable switch is actuated, to effect a parking brake command to actuate an electric park brake when the vehicle speed is less than or equal to the threshold speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
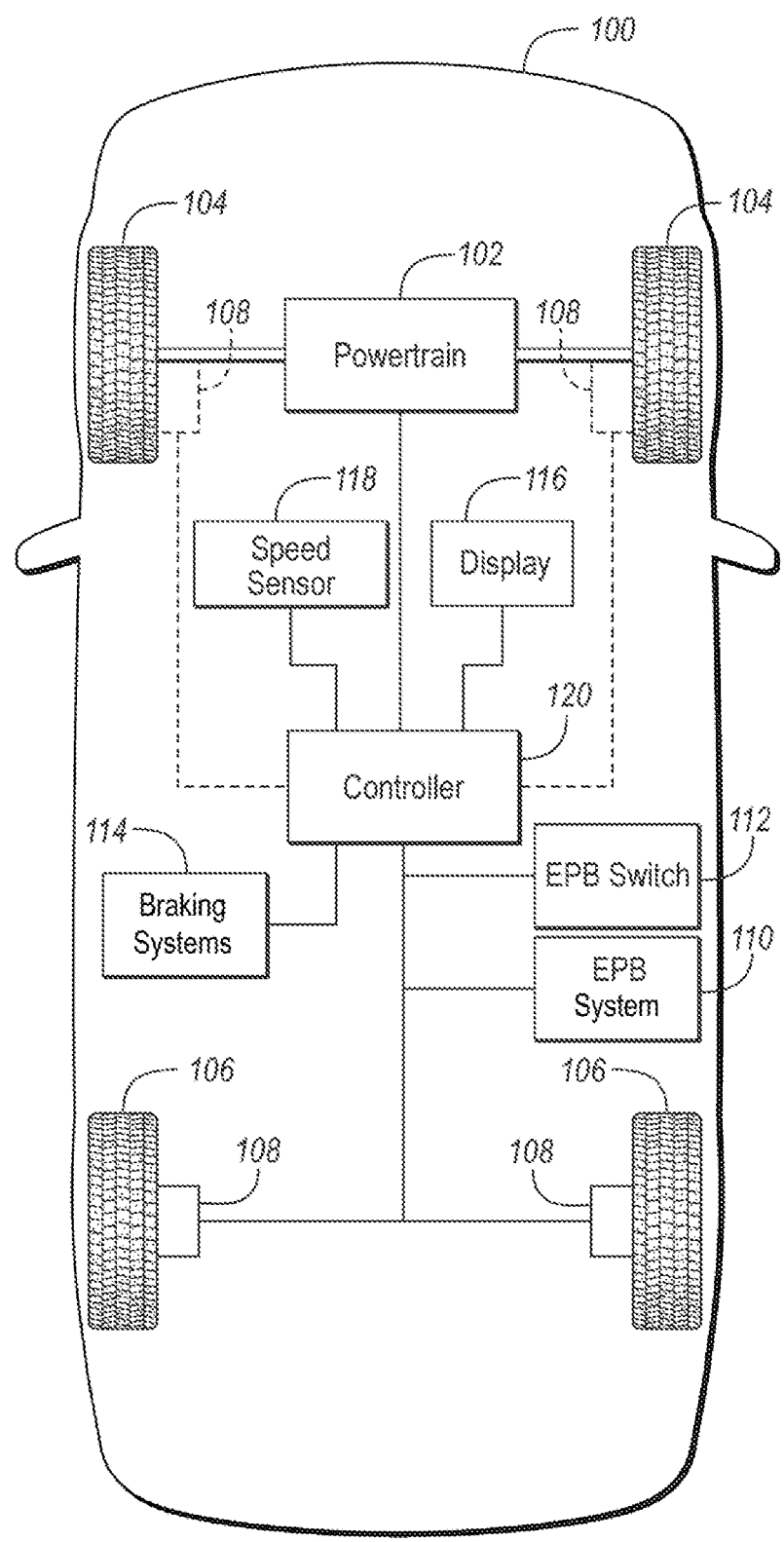
FIG. 1 is a block diagram of a possible vehicle configuration.

FIG. 1 depicts a block diagram of a vehicle 100. The vehicle 100 may include a powertrain 102 configured to provide propulsive torque to one or more drive wheels 104. The vehicle 100 may incorporate any of a variety of powertrain configurations. The powertrain 102 may include an internal combustion engine (ICE) or a diesel engine. The powertrain 102 may include one or more electric machines. In some powertrain configurations, the electric machine may be configured to rotate the engine for starting purposes. In some powertrain configurations, the electric machine may be configured to provide propulsive torque to the drive wheels 104. In a hybrid powertrain, the electric machine may be configured to provide propulsive torque and start the engine. The vehicle 100 may include one or more non-driven wheels 106.

Figure 3:
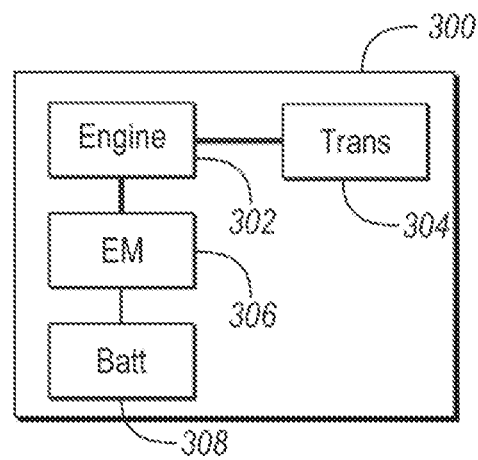
FIG. 3 is a diagram of a vehicle having a powertrain that includes an engine.
Figure 4:
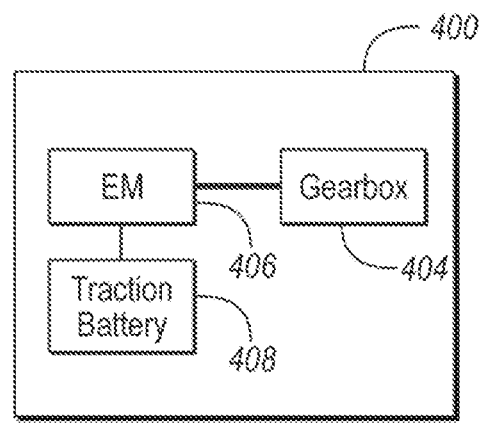
FIG. 4 is a diagram of a vehicle having an electric-only powertrain.
Figure 5:
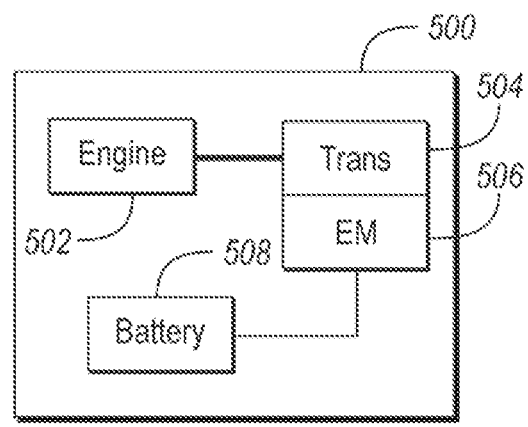
FIG. 5 is a diagram of a vehicle having a hybrid-electric powertrain.

Referring momentarily to FIGS. 3-5, various powertrain configurations are shown. FIG. 3 depicts an example block diagram of a conventional powertrain or a mild-hybrid configuration 300. The mild-hybrid configuration 300 may include an engine 302 mechanically coupled to a transmission 304. The transmission 304 may be coupled to the drive wheels 104 to provide propulsive torque. The transmission 304 may be configured to adjust a gear ratio between the engine 302 and the drive wheels 104. The transmission 304 may be an automatic transmission having a fixed number of gears and shifting without driver intervention. The transmission 304 may be a manual transmission with fixed gears and shifting via driver intervention. The transmission 304 may be a continuously variable transmission (CVT) having a variable gear ratio between the engine and the drive wheels. The mild-hybrid configuration 300 may include a starter/alternator 306 (e.g., electric machine). The starter/alternator 306 may be electrically coupled to a battery 308. The starter/alternator 306 may be configured to rotate a crankshaft of the engine 302 for starting the engine 302 and generating electrical power for the battery 308. In a conventional powertrain, the starter/alternator may be separate electric machines—a starter and an alternator.

FIG. 4 depicts an example block diagram of a battery electric vehicle (BEV) powertrain 400. The BEV powertrain 400 may include an electric machine 406 configured to provide propulsive torque to the drive wheels 104. The electric machine 406 may be mechanically coupled to a gearbox 404 that is configured to provide a gear ratio between the electric machine and the drive wheels 104. The gearbox 404 may be mechanically coupled to the drive wheels 104. The gearbox 404 may have a single gear ratio. The electric machine 406 may derive power from a traction battery 408. A power electronics module (not shown) may electrically couple the electric machine 406 to the traction battery 408.

FIG. 5 depicts an example block diagram of a full hybrid-electric (HEV) powertrain configuration 500. The HEV powertrain 500 may include and engine 502 mechanically coupled to a hybrid transmission 504. The hybrid transmission 504 may be a power-split hybrid configuration including a planetary gearset and coupled to one or more electric machines 506. The electric machines 506 may be electrically coupled to a traction battery 508.

The powertrain components (e.g., engine, transmission, electric machines, power electronics modules, traction battery) may each include a controller configured to control and monitor the associated powertrain component. Under certain conditions, the powertrain component may not be able to operate. Such conditions may be caused by fault conditions or routine maintenance issues. For example, there may be no fuel left to operate the engine. The associated controller may include circuitry and control logic to detect conditions in which the associated powertrain component is unable to operate.

Referring again to FIG. 1, during an ignition cycle, the powertrain 102 may be expected to, upon driver request, provide propulsive torque to the drive wheels 104 of the vehicle 100. An ignition cycle may be considered to be a period of time from a key-on event to a key-off event. Alternatively, the ignition cycle may be that period of time in which the vehicle is in a run condition. Under normal operating conditions, during an ignition cycle, the powertrain 102 may be capable of providing propulsive torque upon request. Under abnormal conditions, the powertrain 102 may be unable provide propulsive torque upon request due to some abnormal condition. For example, the engine may fail to start when requested.

The vehicle 100 may include one or more brake modules 108. The brake modules 108 may be configured to apply a torque to the wheels to resist rotation of the wheels. The brake modules 108 may be configured as disc brakes or drum brakes or some combination thereof. The brake modules 108 may incorporate a parking brake function. The parking brake function may include a mechanism that is configured to maintain a brake application at the wheels. The parking brake function may be applied to a subset of all the wheels. In some configurations, the parking brake function may be applied to all of the wheels. In a mechanical parking brake system, the brake mechanism may be activated by a cable attached to a lever or pedal in an interior of the vehicle 100. In an electric parking brake (EPB) configuration, the parking brake function may be activated electrically using a motor.

The vehicle 100 may include a display module 116 configured to display various status and operational information to the vehicle occupants. The display module 116 may include a display screen configured to display textual messages to the occupants. The display module 116 may include lamps or lights to indicate status in a binary format. The display module 116 may include a message or lamp that conveys the operational status of a braking system 114.

The vehicle 100 may include a speed sensor 118 configured to output a signal that is indicative of the speed of the vehicle 100. The speed sensor 118 may be one or more wheel speed sensors coupled to one or more of the wheels 104, 106. The speed sensor 118 may be an output shaft speed sensor coupled to an output shaft of the powertrain 102.

The vehicle 100 may include at least one controller 120, which may be a vehicle system controller (VSC). The controller 120 may be a powertrain controller, or may be in communication with a powertrain controller. The controller 120 may include a processor for executing instructions. The controller 120 may include volatile and non-volatile memory for storing data and programs. Although depicted as a single module, the controller 120 may include multiple controllers communicating via a vehicle network.

Figure 2:
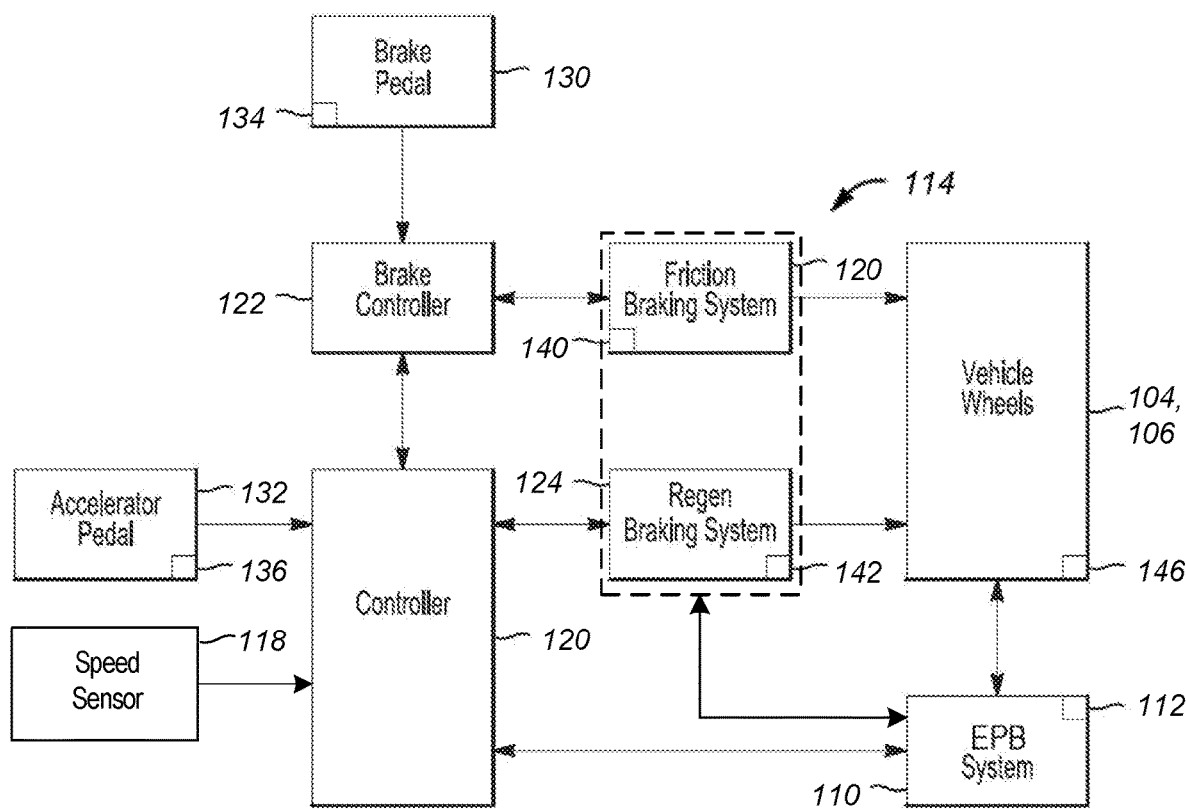
FIG. 2 is a block diagram of selected aspects of the vehicle.

The vehicle 100 may include one or more braking systems 114. Referring to FIG. 2, the vehicle 10 may include a friction braking system 122. The friction braking system 122 may be controlled by a brake controller 124. The brake controller 124 may be, for example, an anti-lock braking system (ABS) controller. The ABS controller may, for example, modulate the brake force actuation to control the amount of tire slip between the tire and the road surface. Such modulation of the brake force may maintain stability of the vehicle during braking.

The vehicle 10 may also include a regenerative braking system 126, which may be part of the vehicle powertrain 102. In particular, the regenerative braking system 126 may include one or more electric machines, such as electric motors, which are operable to provide regenerative braking for the vehicle 100. The regenerative braking system 126 may be controlled by the controller 120. The controller 120 may include other controllers, such as a powertrain control module (PCM). In fact, the brake controller 124, shown in FIG. 2 as a separate controller, may be integrated into the controller 120. Thus, the various systems within the vehicle 100 can be controlled by a single controller, separate software controllers within a single hardware device, or a combination of separate software and hardware controllers.

The brake controller 124 may receive vehicle operator inputs from a brake pedal 130, and the controller 120 may receive operator inputs from an accelerator pedal 132. In particular, a brake pedal angle sensor 134 (which can be more than one sensor or type of sensor), may be configured to detect the position of the brake pedal 130, and send one or more signals to the brake controller 124. Similarly, an accelerator pedal sensor 136 (which can also be more than one sensor), may be configured to detect the position of the accelerator pedal 132, and send one or more signals to the controller 120. The controller 120 and the brake controller 124 may use various inputs, including the inputs from the sensors 134, 136, to decide how to control the friction braking system 122 and the regenerative braking system 126. The friction braking system 122 may operate to slow the speed of vehicle wheels 106 through the application of one or more friction elements. Similarly, the regenerative braking system 126 may be operable to reduce the speed of the vehicle wheels 106 by having at least one electric motor produce a negative torque which may be transferred through the powertrain to the vehicle wheels 106.

The friction braking system 122 may include one or more sensors, represented in FIG. 2 by a single sensor 140. The sensor 140 may be configured to send signals to the brake controller 124 related to various conditions within the friction braking system 122. For example, if the friction braking system 122 should experience reduced braking capability, perhaps due to a loss of boost or the loss of a hydraulic circuit, the sensor 140 can communicate this condition to the brake controller 124, which in turn may communicate with the controller 120. Similarly, the regenerative braking system 126 may have one or more sensors, represented in FIG. 2 by the sensor 142. The sensor 142 may detect such conditions as motor speed, motor torque, power, etc. The sensor 142 may communicate directly with the controller 120, which can use these inputs in combination with the other inputs to control the braking systems 122, 126.

Additional sensors may be provided. For example, a sensor 144, which represents one or more sensors, may be configured to detect conditions of the vehicle wheels 106, including the wheel speed. The sensor 144 is shown in FIG. 2 communicating with the braking systems 122, 126, which in turn communicate with the controller 120. Alternatively, the sensor 144 can be directly connected to the controller 120.

The vehicle 100 may include an electric parking brake (EPB) system 110. The EPB system 110 may be in communication with the controller 120 and one or more braking systems 114 such as the regenerative braking system 126 and/or the friction braking system 122. The EPB system 110 may be configured such that, when the driver activates (e.g., pulls upward on) a parking brake switch while driving, the vehicle 10 may be steadily slowed and/or brought to a controlled stop. When the vehicle 10 is stopped, the EPB system 110 may be adapted to keep the vehicle 10 stationary.

The vehicle 100 may include an EPB switch 112 configured to activate and deactivate the EPB system 110. The EPB switch 112 may be located in proximity to the driver to allow activation and deactivation of the parking brake. In this way, the EPB switch 112 may be a user-actuatable or user-selectable EPB switch.

The EPB switch 112 may be any form of a moveable actuatable switch. The EPB switch 112 may be in the form of a rotatable switch, a lever-type switch, a knob-type switch, a pushbutton-type, a pull rod-type switch, a toggle switch, a flip switch, or other suitable moveable switch. In still another approach, an EPB switch may be in the form of a non-movable switch. For example, an EPB switch may be a touch-responsive switch such as a capacitive touch switch. In at least one approach, the EPB switch may be in the form of a selectable visual indicator that may be displayed, for example, at the display module 116.

The EPB switch 112 may be electrically coupled to the controller 120. The controller 120 may include circuitry for receiving the EPB switch signal and may be programmed to determine the status of the EPB switch 112. The controller 120 may debounce the signal from the EPB switch 112 to minimize the impact of noise. The EPB switch 112 may be configured to have a plurality of positions. For example, in a first position, the parking brake may be released to allow vehicle movement. In a second position, the parking brake may be applied to prevent vehicle movement. In some configurations, the EPB switch 112 may be a push button. In other configurations, the EPB switch may be a pull switch. The controller 120 may be programmed to toggle the parking brake position in response to a press of the push button or a press or pull of the pull switch. For example, when the vehicle 100 is parked, the driver may depress the EPB switch 112 to activate the EPB. The controller 120 may be programmed to actuate an EPB motor in response to an activation of the EPB switch 112 by the driver. Additionally, the controller 120 may be programmed to actuate the EPB motor in response to a signal from another controller (e.g., vehicle powertrain controller) over the communication network. When an actuation signal is received, the controller 120 may instruct the EPB system to actuate and lock the wheels.

In certain approaches, an EPB system, in response to actuation of an EPB switch, may be adapted to activate a friction braking system.

In at least one approach, an EPB system, in response to actuation of an EPB switch, may be adapted to activate a regenerative braking system. For example, when an EPB switch 112 is actuated, a controller 120 may be adapted to effect a regenerative braking command to actuate a regenerative brake system 124 when a vehicle speed is above a threshold speed. The threshold speed may be, for example, in the range of approximately 0 miles per hour to approximately 2 miles per hour. The controller 120 may be further be adapted to effect a parking brake command to actuate an electric park brake when the vehicle speed is less than or equal to the threshold speed. In this way, the electric park brake may be applied when the vehicle has come to rest (e.g., vehicle is stopped), or just before the vehicle comes to rest (e.g., vehicle speed is sufficiently low).

In at least one approach, a vehicle may include a user-actuatable switch (e.g., EPB switch 112) and a controller (controller 120). The controller may be adapted, when the user-actuatable switch is actuated, to effect a regenerative braking command to actuate a regenerative brake system when the switch is in a first position and a vehicle speed is above a threshold speed. The controller may further be adapted, when the user-actuatable switch is actuated, to effect a friction braking command to actuate a friction brake system when the switch is in a second position different than the first position and the vehicle speed is above the threshold speed. The controller may further be adapted, when the user-actuatable switch is actuated, to effect a parking brake command to actuate an electric park brake when the vehicle speed is less than or equal to the threshold speed.

Figure 6:
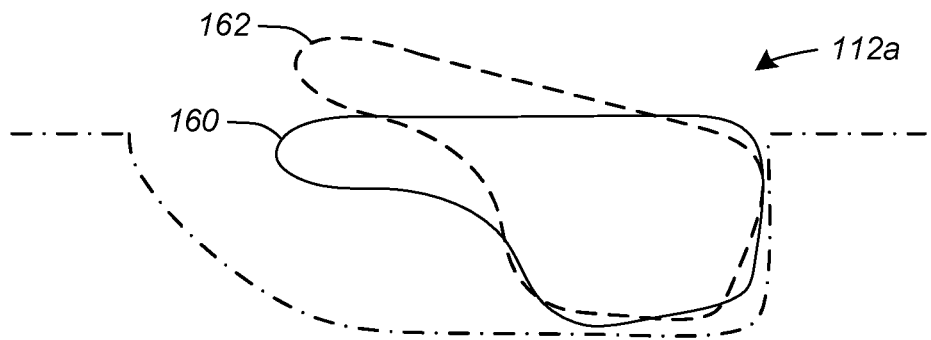
FIG. 6 is a first possible electronic park brake switch configuration.

Referring now to FIG. 6, the EPB system 110 may include a two-position EPB switch 112*a*. In a first position 160 (which may be referred to as a "Neutral" position), the EPB system 110 may be unactuated. A user may move the EPB switch 112*a* (for example, by pulling on the EPB switch 112*a*) to a second position 162 to actuate the EPB system 110. When the user releases the EPB switch 112*a*, the EPB switch 112*a* may move back to the first position 160 (e.g., as the result of a biasing force that may be effected, for example, by a spring).

The user may move EPB switch 112*a* to the second position 162 while the vehicle is moving. In this way, while the vehicle 100 is moving (and, for example, when the user has released the accelerator pedal 132), the user may request a braking force to decelerate the vehicle 100.

In at least one approach, the EPB system 110 may communicate with a braking system 114 as a function of the time the EPB switch 112*a* is maintained in the second position 162. For example, when the user maintains the EPB switch 112*a* in the second position 162 for less than or equal to a predetermined period of time, the EPB system 110 may be adapted to effect a braking action through a first braking system such as the regenerative braking system 126. The predetermined period of time may be, for example, in the range of approximately 0.1 seconds and 2 seconds, and more particularly, in the range of approximately 0.5 seconds and 1.5 seconds, and more particularly, approximately 1 second.

In one exemplary approach, actuation of the EPB switch 112*a* to the second position 162 for less than or equal to the predetermined period of time may signal to the controller 120 that the driver has selected an alternative driving mode. The alternative driving mode may be, for example, a "one pedal" mode in which the vehicle 100 may accelerate when a user presses the accelerator pedal 132 down, and activates the regenerative braking system 126 when the user eases or releases pressure on the accelerator pedal 132.

In at least one approach, actuation of the EPB switch 112*a* to the second position 162 for less than or equal to a predetermined period of time may signal to the controller 120 that the driver has selected an alternative driving mode for the instant braking event. In at least another approach, actuation of the EPB switch 112*a* to the second position 162 for less than or equal to a predetermined period of time may signal to the controller 120 that the driver has selected an alternative driving mode for the instant braking event and subsequent events.

When the user maintains the EPB switch 112*a* in the second position 162 for greater than the predetermined period of time, the EPB system 110 may be adapted to effect a braking action through a second braking system such as the friction braking system 122. Once the vehicle has come to a stop, the EPB system 110 may apply a brake to maintain the vehicle in the stationary position.

Figure 7:
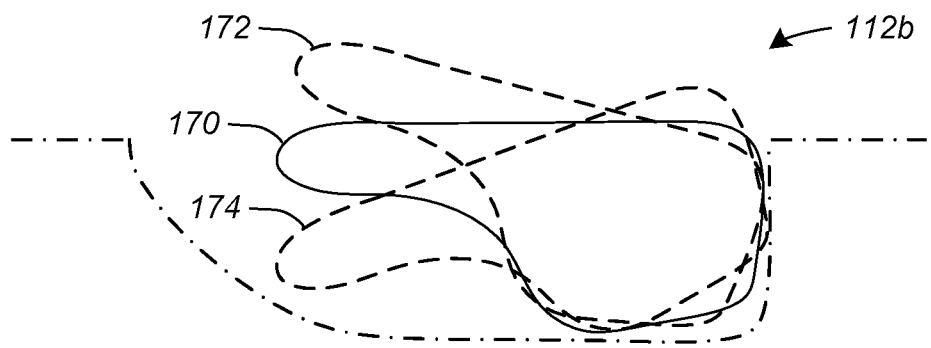
FIG. 7 is a first possible electronic park brake switch configuration.

Referring now to FIG. 7, the EPB system 110 may include a three-position EPB switch 112*b*. In a first position 170 (which may be referred to as a "Neutral" position), the EPB system 110 may be unactuated. A user may move the EPB switch 112*b* (for example, by pulling on the EPB switch 112*b*) to a second position 172 to actuate the EPB system 110. In the second position 172, the EPB switch 112*b* may be angularly displaced relative to the orientation of the EPB switch 112*b* when it is in the first position 170. For example, the EPB switch 112*b* may be angularly displaced in the range of approximately 10° to approximately 30°, and more particularly approximately 20°, relative to the first position 170. When the user releases the EPB switch 112*b* after displacing the EPB switch 112*b* to the second position 172, the EPB switch 112*b* may move back to the first position 170 (e.g., as the result of a biasing force that may be effected, for example, by a spring).

A user may also move the EPB switch 112*b* (for example, by pushing down on the EPB switch 112*b*) to a third position 174 to actuate the EPB system 110. In the third position 174, the EPB switch 112*b* may be angularly displaced relative to the orientation of the EPB switch 112*b* when it is in the first position 170. For example, the EPB switch 112*b* may be angularly displaced in the range of approximately −10° to approximately −30°, and more particularly approximately −20°, relative to the first position 170. When the user releases the EPB switch 112*b* after displacing the EPB switch 112*b* to the third position 174, the EPB switch 112*b* may move back to the first position 170 (e.g., as the result of a biasing force that may be effected, for example, by a spring).

The user may move EPB switch 112*b* to the second and third positions 172, 174 while the vehicle is moving. In this way, while the vehicle 100 is moving (and, for example, when the user has released the accelerator pedal 132), the user may request a braking force to decelerate the vehicle 100.

In at least one approach, the EPB system 110 may communicate with a braking system 114 as a function of the position in which the EPB switch 112*b* is maintained. For example, when the user moves the EPB switch 112*b* to the second position 172, the EPB system 110 may be adapted to effect a braking action through a first braking system. When the user moves the EPB switch 112*b* to the third position 174, the EPB system 110 may be adapted to effect a braking action through a second braking system. In at least one approach, the first braking system is the friction braking system 122, and the second braking system is the regenerative braking system 126. In this way, the second position 172 may be referred to as a "Friction" position, and the third position 174 may be referred to as a "Regen" position. In at least another approach, the first braking system is the regenerative braking system 126, and the second braking system is the friction braking system 122. In this way, the second position 172 may be referred to as a "Regen" position, and the third position 174 may be referred to as a "Friction" position.

Figure 8:
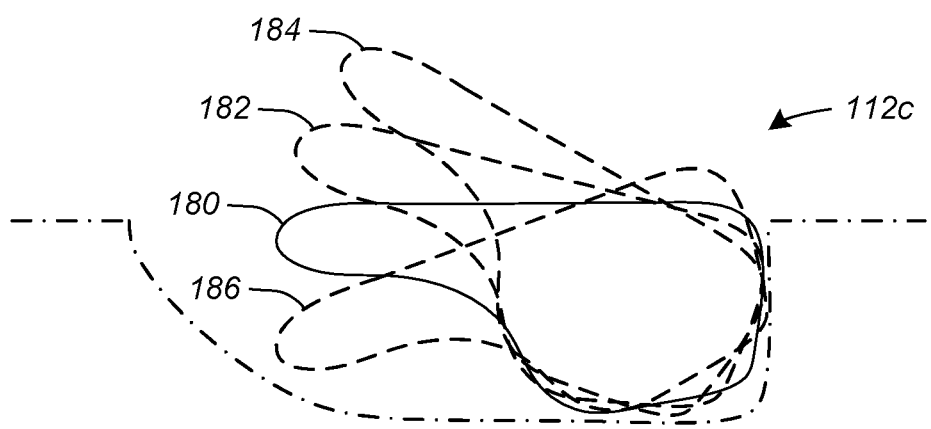
FIG. 8 is a first possible electronic park brake switch configuration.

Referring now to FIG. 8, the EPB system 110 may include a four-position EPB switch 112*c*. In a first position 180 (which may be referred to as a "Neutral" position), the EPB system 110 may be unactuated. A user may move the EPB switch 112*c* (for example, by pulling on the EPB switch 112*c*) to a second position 182 (which may be referred to as a "Regen" position) or to a third position 184 (which may be referred to as a "Friction" position) to actuate the EPB system 110. In at least another approach, the second position 182 may be a "Regen" position, and the third position 184 may be a "Friction" position.

In the second position 182, the EPB switch 112*c* may be angularly displaced relative to the orientation of the EPB switch 112*c* when it is in the first position 180. For example, the EPB switch 112*c* may be angularly displaced in the range of approximately 10° to approximately 30°, and more particularly approximately 20°, relative to the first position 170. In the third position 174, the EPB switch 112*c* may be angularly displaced relative to the orientation of the EPB switch 112*c* when it is in the first position 180 and the second position 182. For example, the EPB switch 112*c* may be angularly displaced in the range of approximately 10° to approximately 30°, and more particularly approximately 20°, relative to the second position 182.

In at least one approach, the EPB switch 112*c* would have a first resistance when moving the EPB switch 112*c* from the first position 180 to the second position 182, and a second resistance when moving the EPB switch 112*c* from the second position 182 to the third position 184. The second resistance may be greater than the first resistance. In this way, the user may experience more resistance from the EPB switch 112*c* when moving the EPB switch 112*c* from the second position 182 to the third position 184 than when moving the EPB switch 112*c* from the first position 180 to the second position 182. When the user releases the EPB switch 112*c* when the EPB switch is in either the second position 182 or the third position 184, the EPB switch 112*c* may move back to the first position 180 (e.g., as the result of a biasing force that may be effected, for example, by a spring).

A user may also move the EPB switch 112*c* (for example, by pushing down on the EPB switch 112*c*) to a fourth position 186 (which may be referred to as a "Release" position) to deactivate the EPB system 110. In the fourth position 186, the EPB switch 112c may be angularly displaced relative to the orientation of the EPB switch 112c when it is in the first position 180. For example, the EPB switch 112c may be angularly displaced in the range of approximately −10° to approximately −30°, and more particularly approximately −20°, relative to the first position 180. When the user releases the EPB switch 112c after displacing the EPB switch 112c to the fourth position 186, the EPB switch 112c may move back to the first position 180 (e.g., as the result of a biasing force that may be effected, for example, by a spring).

The user may move EPB switch 112c to the second, third, and fourth positions 182, 184, 186 while the vehicle is moving. In this way, while the vehicle 100 is moving (and, for example, when the user has released the accelerator pedal 132), the user may request a braking force to decelerate the vehicle 100.

In at least one approach, the EPB system 110 may communicate with a braking system 114 as a function of the position in which the EPB switch 112c is maintained. For example, when the user moves the EPB switch 112c to the second position 182, the EPB system 110 may be adapted to effect a braking action through a first braking system such as the regenerative braking system 126. When the user moves the EPB switch 112c to the third position 184, the EPB system 110 may be adapted to effect a braking action through a second braking system such as the friction braking system 122. When the user moves the EPB switch 112c to the fourth position 176, the EPB system 110 may be adapted to cease a braking action (e.g., at either the friction braking system 122 or the regenerative braking system 126).

In this way, a user, through an EPB switch 112, may effect a deceleration of the vehicle 100 through one or more of the braking systems 114. The deceleration may continue until the vehicle 100 comes to a stop (e.g., is stationary). When the vehicle 100 comes to a stop (or slows to a predetermined vehicle speed), the EPB system 110 may be adapted to apply a parking brake. In at least one approach, the EPB system 110 may be adapted to apply the parking brake when the vehicle 100 is stationary (or slowed to a predetermined vehicle speed) and when the EPB switch 112 is in an actuation position (which may be caused, for example, by user manipulation).

FIGS. 6-8 depict various actuations of braking systems (e.g., a regenerative braking system and a friction braking system) and releases of such braking systems when the EPB switch 112 is moved into various positions or released from various positions. It is expressly contemplated herein that various braking and release controls may be interchangeably associated with the various switch positions described herein. Thus, whereas a friction braking system may be associated with a switch position described herein, a regenerative braking system may instead be associated with the switch position. More particularly, whereas a friction braking system may be associated with a first switch position described herein and a regenerative braking system may be associated with a second switch position described herein, it is expressly contemplated that the regenerative braking system may be associated with the first switch position and the friction braking system may be associated with the second switch position.

As discussed, the EPB switch 112 may be in the form of a rotatable switch, a lever-type switch, a knob-type switch, a pushbutton-type, a pull rod-type switch, a toggle switch, a flip switch, or other suitable moveable switch. In this way, the EPB switch 112 may allow for various positions that may be offset. For example, in the EPB switches shown in FIGS. 6-8, the various positions may be angularly offset. As such, a user may rotate the EPB switches through various angularly offset positions. In still other approaches, the various positions may be linearly offset (e.g., axially offset along an axis). For example, an EPB switch that allows a user to push or pull the EPB switch may have a first position linearly offset from a second position.

Figure 9:
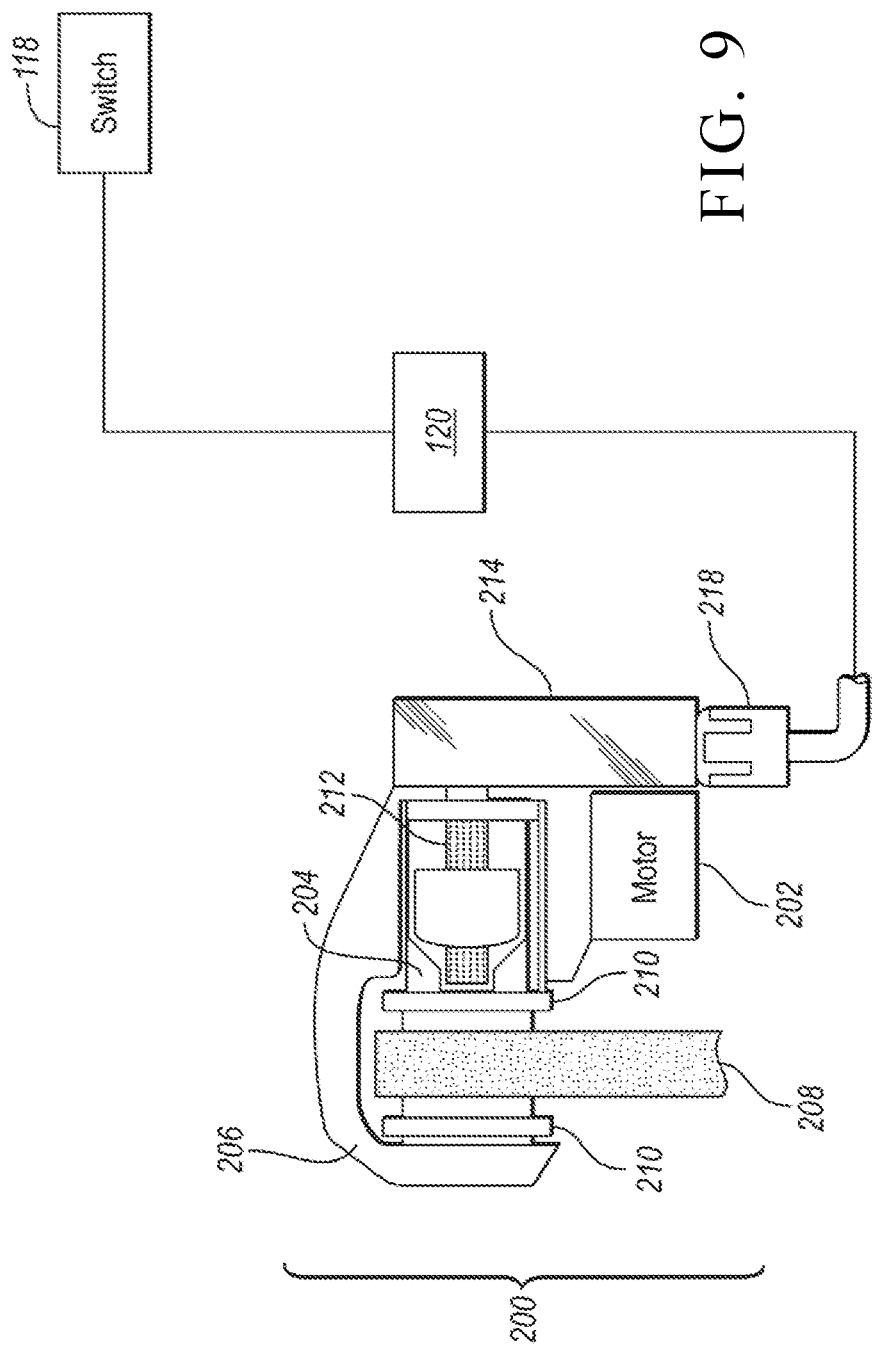
FIG. 9 is a diagram of a possible electric parking brake system.

FIG. 9 depicts a possible implementation of an electric parking brake (EPB) 200. The EPB 200 may be disposed, for example, in the brake modules 108 of the vehicle 100. The EPB 200 may include a motor 202 to actuate a piston 204 and a caliper 206 for disc brakes. A brake system may be a disc-brake system and include a brake rotor 208. Brake pads 210 may be attached to each side of the brake rotor 208 so that the brake rotor 208 can freely move when the caliper 206 is not actuated. The brake piston 204 may be electrically actuated by an EPB motor 202. The EPB motor 202 may be linked to a drive screw 212 through a gear drive 214. The EPB motor 202 and/or gear drive 214 may be electrically linked to the controller 120 through connector 218. The controller 120 may be programmed to control a current distribution to the EPB motor 202.

The EPB 200 may be incorporated in each brake module of a selected axle of the vehicle, for example, the rear wheels. Alternatively, all four wheels may include the EPB 200 or any combination of the drive wheels 104 and non-driven wheels 106 can be fitted with EPB 200.

The controller 120 may be programmed to actuate the EPB motor 202 in response to an activation of the EPB switch 112 by the driver. Additionally, the controller 120 may be programmed to actuate the EPB motor 202 in response to a signal from another controller (e.g., vehicle powertrain controller) over the communication network. When an actuation signal is received, the controller 120 may instruct the EPB 200 to actuate and lock the wheels.

In at least one approach, a method for operating a vehicle includes, at a controller, responsive to a user-actuatable switch being actuated when a vehicle speed is above a threshold speed, effecting a regenerative braking command to actuate a regenerative brake system. The method may further include, at the controller, responsive to the user-actuatable switch being actuated when the vehicle speed is less than or equal to the threshold speed effecting a parking brake command to actuate an electric park brake. The predetermined period of time may be in the range of approximately 0.1 seconds to approximately 2 seconds.

In at least one approach, the user-actuatable switch may be adapted to be moved from a first position to a second position offset from the first position, and a third position offset from the first and second positions. The method may further include effecting various commands at the controller when the vehicle speed is above the threshold speed and the user-actuatable switch is moved to one or more positions. For example, responsive to the user-actuatable switch being moved to the second position, the controller may a friction braking command to actuate a friction brake system. Responsive to the user-actuatable switch being moved to the third position, the controller may effect the regenerative braking command to actuate the regenerative brake system.

In at least another approach, the user-actuatable switch may be adapted to be moved from a first position to a second position offset from the first position, a third position offset from the first and second positions, and a fourth position offset from the first, second, and third positions. The method may further include effecting various commands at the controller when the vehicle speed is above the threshold speed and the user-actuatable switch is moved to one or more positions. For example, responsive to the user-actuatable switch being moved to the second position, the controller may effect the regenerative braking command to actuate the regenerative brake system. Responsive to the user-actuatable switch being moved to the third position, the controller may effect a friction braking command to actuate a friction brake system. Responsive to the user-actuatable switch being moved to the fourth position, the controller may effect a release command to deactivate at least one of the friction brake system and the regenerative brake system.

In at least another approach, the when the vehicle speed is above the threshold speed, the method may include, at the controller, effecting the regenerative braking command to actuate the regenerative brake system in response to the user-actuatable switch being moved to a first position. When the vehicle speed is above the threshold speed, the method may include, at the controller, effecting a friction braking command to actuate a friction brake system in response to the user-actuatable switch being moved to a second position different than the first position.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a brake pedal;
   a brake pedal switch;
   a user-actuatable multi-position switch having an off position and an on position, wherein the user-actuatable multi-position switch is independent of the brake pedal switch; and
   a controller adapted, when the switch is actuated by hand, to:
      effect a regenerative braking command to actuate a regenerative brake system when a vehicle speed is above a threshold speed; and
      effect a parking brake command to actuate an electric park brake when the vehicle speed is less than or equal to the threshold speed.

2. The vehicle of claim 1 wherein the threshold speed is in the range of approximately 0 miles per hour to approximately 2 miles per hour.

3. The vehicle of claim 1 wherein the user-actuatable multi-position switch is a movable user-actuatable switch movable between a first position and a second position offset from the first position, wherein the first position is a neutral position, and wherein the second position is a first actuation position.

4. The vehicle of claim 3 wherein when the vehicle speed is above the threshold speed, the controller is adapted to:
   effect a friction braking command to actuate a friction brake system in response to the multi-position switch being maintained in the second position for a predetermined period of time; and
   effect the regenerative braking command to actuate the regenerative brake system in response to the multi-position switch being maintained in the second position for period of time less than the predetermined period of time and moved to the first position.

5. The vehicle of claim 4 wherein the predetermined period of time is in a range of approximately 0.1 seconds to approximately 2 seconds.

6. The vehicle of claim 3 further comprising a third position offset from the first position and the second position, wherein when the vehicle speed is above the threshold speed the controller is adapted to:
   effect a friction braking command to actuate a friction brake system when the multi-position switch is moved to the second position; and
   effect the regenerative braking command to actuate the regenerative brake system when the multi-position switch is moved to the third position.

7. The vehicle of claim 3 further comprising a third position offset from the first position and the second position and a fourth position offset from the first, second, and third positions, wherein when the vehicle speed is above the threshold speed the controller is adapted to:
   effect the regenerative braking command to actuate the regenerative brake system when the multi-position switch is moved to the second position;
   effect a friction braking command to actuate a friction brake system when the multi-position switch is moved to the third position; and
   effect a release command to deactivate at least one of the friction brake system and the regenerative brake system when the multi-position switch is moved to the fourth position.

8. The vehicle of claim 1 wherein the controller is adapted to:
   when a vehicle speed is above the threshold speed,
      effect the regenerative braking command to actuate the regenerative brake system when the multi-position switch is in a first position; and
      effect a friction braking command to actuate a friction brake system when the switch is in a second position different than the first position.

9. A method for operating a vehicle comprising:
   at a controller,
      responsive to a user-actuatable multi-position switch being actuated by hand when a vehicle speed is above a threshold speed, effecting a regenerative braking command to actuate a regenerative brake system; and
      responsive to the user-actuatable multi-position switch being actuated k hand when the vehicle speed is less than or equal to the threshold speed, effecting a parking brake command to actuate an electric park brake.

10. The method of claim 9 wherein the threshold speed is in the range of approximately 0 miles per hour to approximately 2 miles per hour.

11. The method of claim 9 wherein the user-actuatable switch is adapted to be moved from a first position to a second position offset from the first position, and wherein the method further comprises:
at the controller, when the vehicle speed is above the threshold speed,
responsive to the user-actuatable switch being maintained in the second position for a predetermined period of time, effecting a friction braking command to actuate a friction brake system; and
responsive to the user-actuatable switch being maintained in the second position for period of time less than the predetermined period of time and moved to the first position, effecting the regenerative braking command to actuate the regenerative brake system.

12. The method of claim 11 wherein the predetermined period of time is in the range of approximately 0.1 seconds to approximately 2 seconds.

13. The method of claim 9 wherein the user-actuatable switch is adapted to be moved from a first position to a second position offset from the first position, and a third position offset from the first and second positions, and wherein the method further comprises:
at the controller, when the vehicle speed is above the threshold speed,
responsive to the user-actuatable switch being moved to the second position, effecting a friction braking command to actuate a friction brake system; and
responsive to the user-actuatable switch being moved to the third position, effecting the regenerative braking command to actuate the regenerative brake system.

14. The method of claim 9 wherein the user-actuatable switch is adapted to be moved from a first position to a second position offset from the first position, a third position offset from the first and second positions, and a fourth position offset from the first, second, and third positions, and wherein the method further comprises:
at the controller, when the vehicle speed is above the threshold speed,
responsive to the user-actuatable switch being moved to the second position, effecting the regenerative braking command to actuate the regenerative brake system;
responsive to the user-actuatable switch being moved to the third position, effecting a friction braking command to actuate a friction brake system; and
responsive to the user-actuatable switch being moved to the fourth position, effecting a release command to deactuate at least one of the friction brake system and the regenerative brake system.

15. The method of claim 9 further comprising:
at the controller, when the vehicle speed is above the threshold speed,
effecting the regenerative braking command to actuate the regenerative brake system in response to the user-actuatable switch being moved to a first position; and
effecting a friction braking command to actuate a friction brake system in response to the user-actuatable switch being moved to a second position different than the first position.

16. A vehicle comprising:
a brake pedal;
a brake pedal switch;
a user-actuatable multi-position switch having an off position, a first position, and a second position wherein the user-actuatable multi-position switch is independent of the brake pedal switch; and
a controller adapted, when the user-actuatable multi-position switch is actuated, to:
effect a regenerative braking command to actuate a regenerative brake system when the multi-position switch is in a first position and a vehicle speed is above a threshold speed;
effect a friction braking command to actuate a friction brake system when the multi-position switch is in a second position different than the first position and the vehicle speed is above the threshold speed; and
effect a parking brake command to actuate an electric park brake when the multi-position switch is in either the first position or the second position and the vehicle speed is less than or equal to the threshold speed.

17. The vehicle of claim 16 wherein the user-actuatable multi-position switch is movable between a first position and a second position offset from the first position, wherein when the multi-position switch is maintained in the second position for a predetermined period of time, the controller is adapted to effect a regenerative braking command to actuate the regenerative brake system when the vehicle speed is above the threshold speed, and wherein when the multi-position switch is maintained in the second position for less than the predetermined period of time, the controller is adapted to effect a friction braking command to actuate a friction brake system when the vehicle speed is above the threshold speed.

18. The vehicle of claim 16 wherein the user-actuatable multi-position switch is movable between a first position, a second position offset from the first position, and a third position offset from the first and second positions, wherein the controller is adapted to effect a friction braking command to actuate a friction brake system when the multi-position switch is moved to the second position and the vehicle speed is above the threshold speed, and wherein the controller is adapted to effect the regenerative braking command to actuate the regenerative brake system when the multi-position switch is moved to the third position and the vehicle speed is above the threshold speed.

19. The vehicle of claim 16 wherein the user-actuatable multi-position switch is movable between a first position, a second position offset from the first position, a third position offset from the first and second positions, and a fourth position offset from the first, second, and third positions, wherein the controller is adapted to effect a regenerative braking command to actuate a regenerative brake system when the multi-position switch is moved to the second position and the vehicle speed is above the threshold speed, wherein the controller is adapted to effect the friction braking command to actuate the friction brake system when the multi-position switch is moved to the third position and the vehicle speed is above the threshold speed, and wherein the controller is adapted to effect a release command to deactuate at least one of the friction brake system and the regenerative brake system.

20. The vehicle of claim 16 wherein the threshold speed is in a range of approximately 0 miles per hour and approximately 2 miles per hour.

* * * * *